May 17, 1938. G. A. TINNERMAN 2,117,775
FASTENING DEVICE
Filed Dec. 3, 1936

INVENTOR.
GEORGE A. TINNERMAN
BY
Bates, Golrick, & Teare
ATTORNEYS

Patented May 17, 1938

2,117,775

UNITED STATES PATENT OFFICE 2,117,775

FASTENING DEVICE

George A. Tinnerman, Rocky River, Ohio, assignor to Albert H. Tinnerman, Cleveland, Ohio Application December 3, 1936, Serial No. 113,949

4 Claims. (Cl. 85—36)

This invention relates to threadless fasteners, or to means for fastening one or more threaded members to a supporting plate, wherein the head of the threaded member acts to hold one or more pieces of an assembly to the plate. Supports of this character have heretofore been assembled by the use of separate fastening devices, such as threaded nuts or strips of wood, which have been mounted behind the supporting plate, and which have been adapted to be pierced by the threaded member.

An objection to the use of a threaded nut in a plate assembly is that it necessitates a rigid connection between the nut and plate, such as by a riveting or welding operation, while an objection to the use of wood is the expense and the difficulty of properly securing the wood in place. Moreover, wood lacks the permanency of metal.

Heretofore, an effort has been made to produce fasteners by extruding metal from the plate to form the fastener. Where the metal has been relatively soft, however, the resulting fastener has lacked the desired mechanical strength, because the extruded portion could not be hardened independently of the plate. The lack of strength in the metal would allow the fastening portion to be pulled through the plate whenever excessive pressure was placed upon the threaded member.

An object of the present invention is to make a threadless fastener, which is so formed that it cannot readily be pulled through the plate notwithstanding the fact that the plate is made of relatively soft metal, such as annealed metal. My invention, however is equally well adapted for use in connection with fasteners that are made from hardened metal, as it increases the strength of the fastener.

Figure 1:
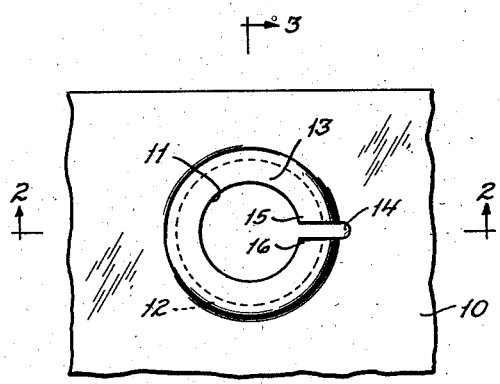
Figure 3:
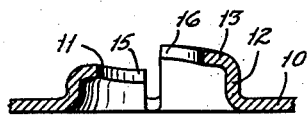
Figure 2:
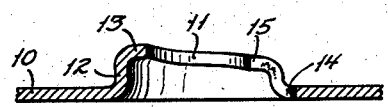
Figure 4:
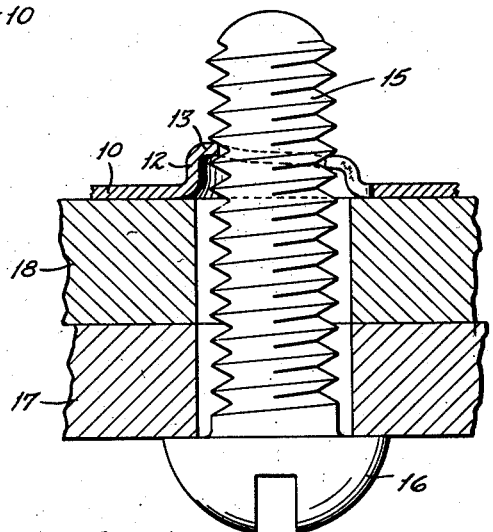
Figure 5:
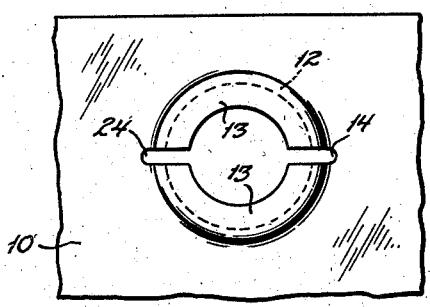
Figure 6:
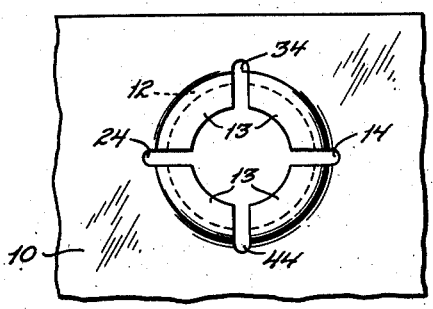
Figure 7:
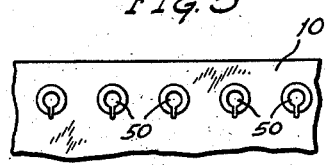

Referring now to the drawing, Fig. 1 is a plan view of a plate having a threadless fastener formed thereon in accordance with my invention; Figs. 2 and 3 are sections taken on the correspondingly numbered lines in Fig. 1; Fig. 4 is a sectional view taken through the fastener and illustrating it in operation; Figs. 5 and 6 are top plan views illustrating modifications of the fastener construction, and Fig. 7 is a top view of a plate illustrating the use of the fasteners, which are extruded in multiple therefrom.

The fastener, which I have devised is illustrated in connection with a body portion 10, which has an aperture 11 therein for receiving the shank of a threaded member. The metal surrounding the aperture is extruded from the body in such manner as to provide a wall 12 which extends around the aperture and substantially at right angles to the plane of the body portion. The top of the wall may terminate in an inwardly extending flange 13 which is adapted to coact with the threaded member. The wall 12 and the flange 13 are shaped to conform to the helix of a thread, and to this end, the body is notched radially from the aperture, as at 14, thus providing tongues 15 and 16, which are at different elevations with respect to the body portion, the difference corresponding to the pitch distance of the thread on the member with which the fastener is to be used.

In Fig. 4 the fastener is illustrated in connection with a threaded bolt 15, the head 16 of which bears against the article 17, which is apertured to receive the shank of a bolt, while another article designated at 18 is interposed between the article 17 and the plate 10.

In an assembly, such as that indicated in Fig. 4, the plate 10 may have one or more fasteners formed thereon and may be rigidly attached to any supporting surface; thereupon the articles, such as those designated at 17 and 18, may be fastened to the plate even though the fastener part is positioned in a blind location. By having the wall 12 of the fastener portion extending in the same general direction as the axis of the shank on the threaded member, any force which is exerted upon the fastener in a direction tending to pull the flange 13 through the plate will be resisted by the wall 12. This construction adds greatly to the strength of the fastener, notwithstanding the fact that the body of the fastener may be made of soft metal.

The modification of Fig. 5 differs from that shown in Fig. 1 in that the body of the fastener has two diametrically opposed notches 14 and 24 instead of one notch, while the modification of Fig. 6 has four notches, as shown at 14, 24, 34 and 44, all of which may extend radially and at right angles. Notwithstanding the fact that one or more notches are used in the various modifications, the wall construction 12 and the flange construction 13 are substantially the same in all forms. The notches in the modification of Fig. 6 are so placed that when the fastening member 15 is tightened, the segments between the notches have a tendency to draw in towards the root of the thread on the threaded member, thereby giving additional frictional contact so as to prevent ready loosening as a result of vibration during use. Fig. 7 shows a plate 10 which has a plurality of fasteners 50 made in accordance with my invention and extruded therefrom.

The fastener which is made in accordance with the present invention has a decided commercial advantage in that it may be extruded in multiple from a plate notwithstanding the fact that the plate is made of unhardened metal and that the fasteners so made will have sufficient strength to withstand or resist the tendency of a threaded member to pull it through the plate. If desired, the same form of fastener may be made in small individual units, it being understood that the size of the body portion is not limited in any respect.

I claim:

1. A threadless fastener comprising a body portion having an aperture therein for receiving a threaded member, the body having a notch extending radially from the aperture, and having that portion thereof adjacent the aperture deformed to provide a continuous wall from one side of the notch around the aperture to the other side of the notch, the wall extending substantially at a right angle from the body and having an inturned flange which comprises the thread engaging portion of the fastener, the flange and the wall at its juncture with the flange being helically shaped, whereby the edge of the flange at one side of the notch is spaced axially from that at the other side of the notch a distance substantially equal to the pitch distance of the thread on the member with which the fastener is to be used.

2. A threadless fastener having a substantially flat body portion and a thread engaging portion stamped therefrom, the thread engaging portion including a wall that projects upwardly at substantially a right angle from the body and that has an inturned flange adjacent the top thereof, there being a slot extending through the flange and wall, and the flange on one side of the slot being spaced axially from that on the other side by a distance which corresponds to that of the pitch distance on the bolt with which the fastener is intended to be used.

3. A threadless fastener comprising a substantially flat body portion having a wall of substantially right angular formation relatively to the flat body stamped therefrom, the top of the wall terminating in a flange which is arranged in the form of a helix defining an aperture for receiving a threaded member, whereby the marginal edges of the aperture conform to the thread of such member.

4. A threadless fastener comprising a substantially flat body portion having an aperture therein for receiving a shank of a threaded member, that portion of the body which surrounds the aperture being deformed to provide a wall of substantially cylindrical formation, the top of which terminates in a flange that is arranged in the form of a helix in conformation to such threaded member.

GEORGE A. TINNERMAN.